United States Patent [19]

Proni

[11] Patent Number: 4,743,051
[45] Date of Patent: May 10, 1988

[54] QUICK CONNECT COUPLING ASSEMBLY CAPABLE OF QUICK OR SLOW DISCONNECTION

[76] Inventor: Oscar Proni, 4501 Monroe Ave., Hollywood, Fla. 33023

[21] Appl. No.: 924,992

[22] Filed: Oct. 23, 1986

[51] Int. Cl.⁴ .............................................. F16L 39/00
[52] U.S. Cl. .................................... 285/319; 285/320; 285/921
[58] Field of Search ........................ 285/319, 320, 921

[56] References Cited

U.S. PATENT DOCUMENTS

| | | | |
|---|---|---|---|
| 3,826,523 | 7/1974 | Eschbaugh | 285/921 X |
| 4,135,745 | 1/1979 | Dehar | 285/319 |
| 4,423,892 | 1/1984 | Bartholomew | 285/319 |
| 4,637,640 | 1/1987 | Fournier et al. | 285/921 X |

FOREIGN PATENT DOCUMENTS 2086513  5/1982  United Kingdom ............... 285/921

Primary Examiner—Richard J. Scanlan, Jr.
Attorney, Agent, or Firm—Charles J. Prescott

[57] ABSTRACT

A fitting or coupling assembly designed and structured to be used with either high or low pressure hydraulic or gaseous fluids and including a primary body secured to a retaining member, preferably by a threaded connection and each having a respective coaxially aligned central channel and passage, when connected, in which a conduit having a stop member formed on the outer surface thereof is positioned and fixed therein by means of a quick connection and selectively removable therefrom either by a quick disconnection or slow disconnection depending upon selective disengagement of said stop member from said retaining member or alternately disengagement of said primary body from said retaining member.

10 Claims, 5 Drawing Sheets

QUICK CONNECT COUPLING ASSEMBLY CAPABLE OF QUICK OR SLOW DISCONNECTION

BACKGROUND OF THE INVENTION

A fluid coupling or fitting specifically structured for the quick connection to an internally fitted fluid channeling conduit wherein the coupling assembly is specifically structured to accomplish a quick disconnect such as in low pressure application or a slow disconnection and removal of the conduit such as in high pressure application or when the coupling and associated conduit is used for the handling of relatively hot liquid such as in hydraulics.

THE PRIOR ART

Quick connect-disconnect couplings or fitting assemblies have been known in the prior art for many years. Such prior art couplings are also applied in the handling of either hydraulic or gaseous fluids and the design and structural configuration of such couplings vary widely dependent upon the particular application for which they are intended.

While such quick connect-disconnect couplings are primarily designed for convenience of installation and removal, couplings of this type either present a safety hazard or are not capable of being used when the fluids being handled or channeled through the coupling or fitting are under a relatively high pressure. This is due to the well recognized problem that an inadvertent quick disconnect of a conduit or coupling from its mating component could cause a rapid discharge of the fluid being handled due to the high pressure involved. Accordingly, such quick connect-disconnect couplings are generally not considered safe when dealing with high pressure applications.

Of the prior art fittings or coupling assemblies available there are generally considered to be two broad categories. These categories include first the relatively expensive generally spring-loaded, quick connect type of coupling and secondly, the relatively inexpensive, quick connect but less than quick disconnect type of coupling or fitting. The latter structure is generally found in low pressure applications such as plumbing or the like.

Certain inherent and well recognized disadvantages present in prior art structures include the relatively complex structure requiring several relatively expensive mating components, some of which components include and are specifically directed to the spring-loading effect necessary particularly to accomplish the quick disconnect features of prior art couplings. Particularly when dealing with high or even moderately high pressure certain features of the quick disconnection can be dangerous, as set forth above. This same danger occur when dealing with fluids which are utilized at relatively high temperatures. It should be readily apparent that an inadvertent disconnection of a coupling or fitting assembly could result in serious damage done to the surrounding personnel.

Accordingly, there is a need in this industry for a fitting or coupling assembly capable of operating both as a quick connect and quick disconnect type of coupling wherein a conduit or tube, used to channel fluid, under pressure, may be readily attached or disconnected from a fitting or coupling assembly. In addition, such a preferred fitting assembly should be structured so as to accomplish what may be herein referred to as a slow disconnect or detachment of the conduit from the fitting or coupling wherein such "slow disconnect" is particularly applicable for situations involving high pressure or even moderately high pressure or when dealing with fluid at relatively high temperatures. In addition the preferred fitting or coupling assembly should be further structured to have certain inherent safety features even when removing or disconnecting the aforementioned fluid handling conduit by a quick disconnect operation. Such a safety feature would eliminate or seriously reduce damage done to the user of the coupling, or surrounding personnel, when a quick disconnect of the conduit is attempted inadvertently under high pressure conditions.

SUMMARY OF THE INVENTION

This invention relates to a fluid fitting or coupling assembly of the type specifically designed to provide a quick connection or disconnection of a fluid handling conduit into a fitting or coupling for interconnection of the conduit through tubing, conduits, channels, etc. More specifically the coupling assembly of the present invention is specifically structured and designed to provide for a slow disconnection of the conduit from the coupling assembly wherein such slow disconnection may be generally defined as gradual removal or displacement of the fluid handling conduit from the fluid tight sealing engagement with the coupling assembly so as to gradually release or reduce the fluid pressure thereby preventing any extremely rapid escape of pressurized fluid or an inadvertent separation of the coupling assembly itself.

As will be explained in greater detail hereinafter, the coupling assembly of the present invention comprises a primary body having a central channel extending coaxially therethrough wherein one end of the body may take the form of any one of a variety of male fittings for interconnection to additional fluid directing conduit, tubing, etc. The other end of the primary body is connected to a retaining member, preferably in the form of a ring having a main portion which, in a preferred embodiment, is removably attached to the main body as by a threaded connection. The retaining member further includes a plurality of arms including at least two arms disposed in opposed, spaced apart relation to one another wherein the arms are pivotally secured to the main portion of the retaining member. Each arm includes an inwardly directed angularly oriented retaining finger extending inwardly towards a longitudinal central axis of the central passage of the retaining member wherein the central passage of the retaining member and the central channel of the primary body are disposed in aligned coaxial relation to one another for receipt and maintenance of a fluid channeling conduit therein. The conduit is positioned such that an open end thereof is disposed on the interior of the primary body in fluid receiving relation to a high pressure end or side of the primary body for channeling of fluid therethrough.

An important feature of the present invention is the placement of a seal means, which may be in the form of one or more O-rings engaging the exterior surface of the container conduit in spaced relation from the open end thereof Another important feature of the present invention is the existence of a stop member integrally formed on the exterior surface of the conduit and in one embodiment, extending outwardly therefrom into cooperative abutting, interruptive engagement with a free or distal end of each of the retaining fingers. Accordingly, in a retained and "locked" position the stop member is positioned between one end of the primary body and the retaining fingers and effectively wedged or locked in such position due to the inability of the fingers to flex or move outwardly along the direction of their own length.

However, the retaining member and specifically the opposing arms containing the retaining fingers are pivotally connected such that an opposing inwardly directed force to both fingers, concurrently, will cause the retaining fingers to be pivoted out of abutting, interruptive engagement with the stop member thereby providing a quick removal and disconnection of the conduit from the interior of the primary body and retaining member and outwardly from the aligned central channel and central passage of the body and retaining member respectively. The quick connect insertion or coupling of the conduit to the primary body and retaining member occurs just as simply by axially directed force disposing the conduit and specifically the open end thereof into the aligned passage and channel. The inherent flexibility of the arms and/or the retaining fingers themselves will allow the pivotal movement of the fingers and/or the arms in an outward direction transverse to the length of the fingers. As set forth above, the displacement of the retaining fingers along their own length in a direction outwardly towards the respective arms from the free or distal ends of the retaining fingers is prevented specifically due to the angular inclination or orientation of the retaining finger.

A slow disconnection or removal of the conduit is accomplished by a progressive detachment of the retaining member from the primary body such as when the two aforementioned members are unthreaded from one another. This gradual or progressive removal or displacement of the retaining member from the primary body causes a concurrent progressive and gradual displacement of the open end of the conduit along the interior of the central channel of the primary body in the direction of fluid flow through the coupling. This gradual displacement of the conduit is caused by the fluid pressure itself acting on the open end. Once the open end passes beyond the seal means associated with the primary body the fluid tight seal defined therebetween is broken and the high pressure fluid is allowed to escape in a somewhat "controlled" fashion between the exterior surface of the conduit and the interior surface of the primary body and eventually into an expansion chamber or space of enlarged dimension. Escape of the pressurized fluid into the aforementioned expansion space which is defined by a greater interior diameter of the retaining member allows at least partially, the high pressure state of the fluid to be dissipated thereby somewhat relieving or reducing the danger in a quick release coupling. A complete separation of the primary body from the retaining member will cause a complete separation of the conduit and displacement thereof from the sealing engagement with the primary body.

DETAILED DESCRIPTION OF THE INVENTION

Figure 1:
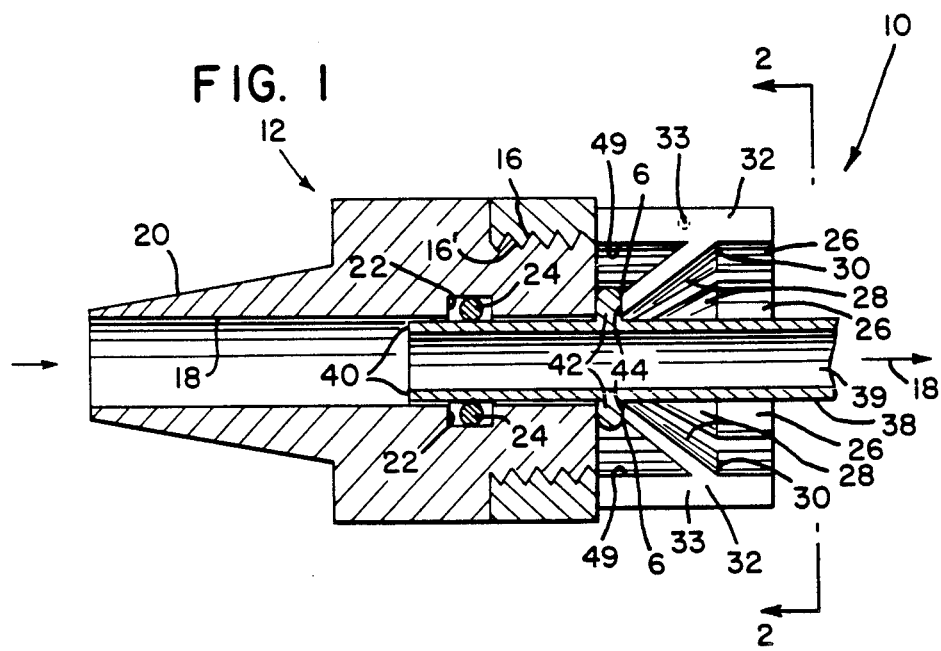
FIG. 1 is a longitudinal cross sectional view of a preferred embodiment of the coupling assembly of the present invention.

As shown in FIG. 1, the coupling assembly of the present invention is generally indicated as 10 and includes a primary body 12 having one free end, as pictured in FIG. 1, which may be any type of fitting, such as a male fitting 20. The coupling assembly 10 further includes a retaining member generally indicated as 14 where, in a preferred embodiment as shown in FIG. 1, the body 12 and the retaining member 14 are removably connected together by means of a threaded connection as at 16 and 16'. The primary body has a centrally disposed channel extending completely therethrough and, for purposes of explanation the free end of the body 12, as shown in FIG. 1 will be considered the high pressure site wherein pressure is entering the coupling assembly 10 under pressure from the free end passing through the channel 13. The primary body 12 further includes a seal means preferably in the form of an O-ring 24 mounted in a groove or like integrally formed recess or channel 22 and dimensioned and positioned so as to extend outwardly therefrom into sealing engagement with the external surface of any type of conduit 38 connected to the coupling or fitting assembly 10 by passing into the central channel 18.

Figure 2:
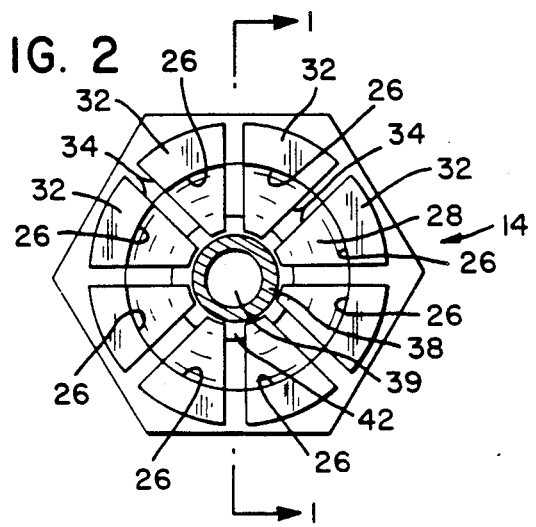
FIG. 2 is an end view along line 2—2 of FIG. 1.

Similarly, the retaining member 14 includes a central channel 26 of somewhat greater inside diameter. As shown in FIGS. 1 and 2 the retaining member 14 includes a main portion 27 and a plurality of arms 32 extending outwardly therefrom in parallel relation to the longitudinal axis of the passage 26. Each arm 32 is spaced apart from one another by proper spacing 34 extending between each of the plurality of fingers 32 as shown. The spacings 34 are represented to be between a plurality of fingers where in reality the subject coupling assembly would operate in effect with only two opposing fingers as best represented in longitudinal section of FIG. 1 and indicated as 32. Accordingly, each of the arms 32 are pivotally connected substantially at 33 to the main portion 27 of the retaining member 14 and further, each of the arms 32 include a depending finger 28 integrally or otherwise attached thereto which may be formed of somewhat inherently flexible material and which extend inwardly toward the interior of the retaining member and longitudinal central axis of the passage 26 at an angular incline toward the primary body 12 as clearly shown in FIG. 1. These fingers 28 are joined at junction 30 between the respective retaining arms 32 at one end of the respective retaining fingers 28. The opposite end of each of the respective fingers 28 is represented as 44 and cooperates with a stop member indicated as 42. The stop member 42 is spaced inwardly along the length of the conduit 38 from the open end 40 and preferably, in the embodiment of FIG. 1, outwardly from the outer surface of the conduit 38. Further, the stop member 42 may be in the form of an integrally formed outwardly extending annularly configured rim or ring protruding a sufficient distance outwardly from the outer surface of the conduit 38 to engage the free or distal end 44 of the retaining fingers 28.

Another important feature is the spacing of the stop member 42 a sufficient distance from the open end 40 of conduit 38 to allow the open end 40 be positioned beyond or upstream of the seal means 24 so as to establish a fluid tight seal between the conduit and the interior of the primary body 12.

With regard to FIGS. 3A–B, 4A–B and 5A–B, the specific structural features of the present invention allow the structural embodiment of FIGS. 1–5 to be selectively connected in what may be referred to as a quick connect mode and disconnected in what may be referred to as a quick disconnect mode and through further manipulation of the coupling to be further disconnected alternately by a slow disconnect mode such as in high pressure situations when disconnection must be done carefully and preferably concurrent to at least some fluid pressure dissipation prior to complete separation of the conduit 38 from the coupling assembly 10.

Figure 3A:
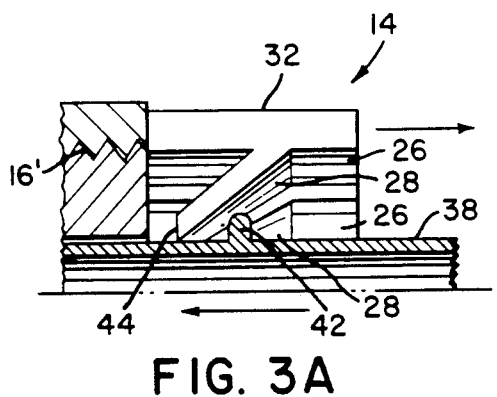
FIGS. 3A, 3B and 3C are progressive views in cross section and partial cutaway showing reaction of the various components of the coupling assembly to accomplish a quick-connect insertion of the conduit relative to the interior of the coupling assembly.
Figure 3B:
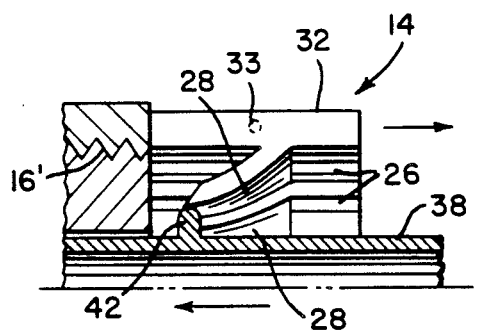
Figure 3C:
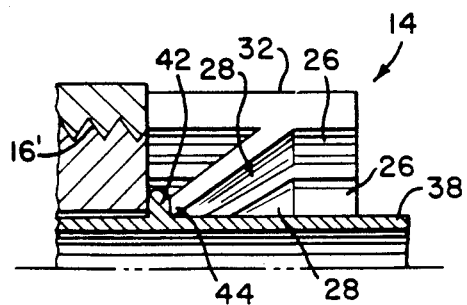

With regard to FIGS. 3A–C, the various steps shown indicate the relative positions of each of the retaining fingers 28 and arms 32 of the retaining member 14 while the conduit 38 is being inserted. Such quick connect insertion is accomplished merely by axial pushing or pressure being applied on the conduit 38 relative to the retaining member in the direction indicated by arrow 41. FIG. 3A shows the stop member 42 immediately prior to coming in contact with the free end 44 of the retaining finger 28. FIG. 3B shows actual contact being made and the outward flexure or pivotal movement of the finger 28 as the stop member passes beyond the free end 44 of the finger 28. The angular inclination and specific orientation of the retaining finger 28 allows the inward flexure as represented in FIG. 3B.

Once the conduit 38 is properly positioned such that stop member 42 is beyond the free end 44 of the retaining fingers 28, the retaining fingers 28 are prevented from flexing in a reverse or outer direction from that shown in FIG. 3B due to their angular inclination. For purposes of clarity, FIGS. 3A, 3B and 3C are shown primarily without direct connection to the primary body 12. Suffice it to say at this point however that such action of the finger occurs while the primary body 12 and retaining member 14 are in the assembled position as represented in FIG. 1.

Figure 4A:
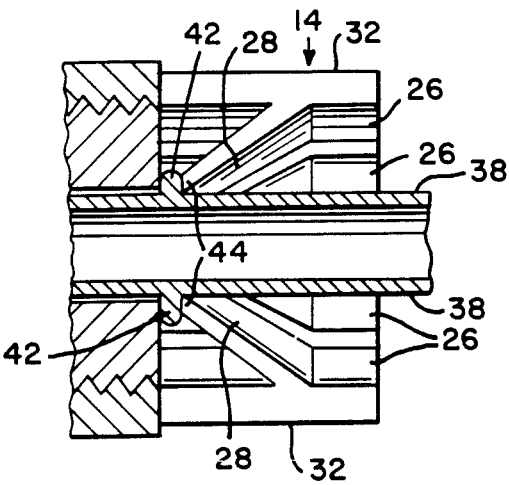
FIGS. 4A, 4B and 4C each represent a sectional view in partial cutaway representing the relative components and their cooperative relation to one another to accomplish a quick disconnection or removal of the conduit.
Figure 4B:
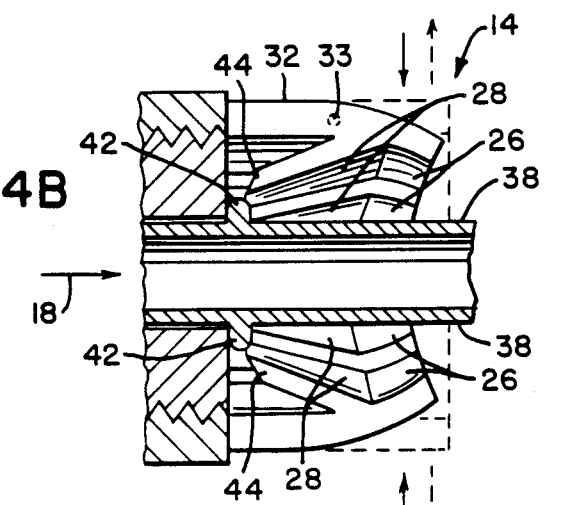
Figure 4C:
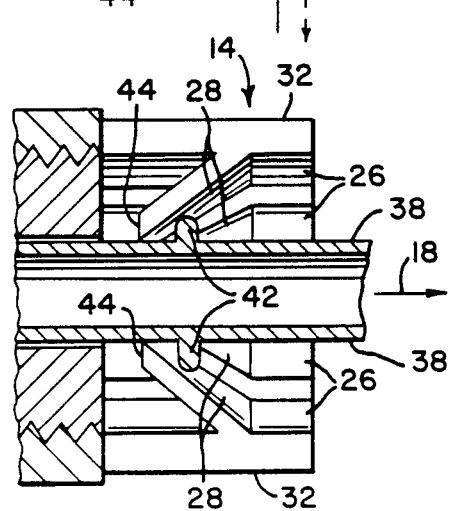

With regard to FIGS. 4A, 4B and 4C the quick disconnect mode of operation is shown. As shown in FIG. 4A the conduit 38 is in its locked and maintained position on the interior of the retaining member 14.

FIG. 4B shows external inwardly directed concurrent force being applied as indicated by the directional arrows preferably to the ends of the arms 32. Such concurrent external pressure being applied causes a pivotal movement of the arms 32 about pivot points 33 and an entire inward movement of the retaining fingers 28 and specifically the free ends thereof as at 44 beyond the stop member 42. The conduit is thereby free to move outwardly and be quickly disconnected from the entire coupling assembly 10 as shown in FIG. 4C. It should also be emphasized that the pivot point 33 is located substantially at the juncture of the arm 32 relative to the main body portion 27 and in substantially corresponding position where the various spaces 34 between the arms 32 end or terminate at the main portion 27 of the retaining element 14.

Figure 5A:
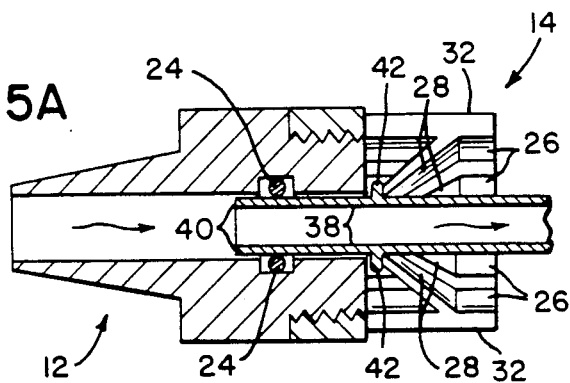
FIGS. 5A, 5B and 5C are cross sectional views in partial cutaway showing a slow disconnect of the conduit from the interior of the coupling assembly
Figure 5B:
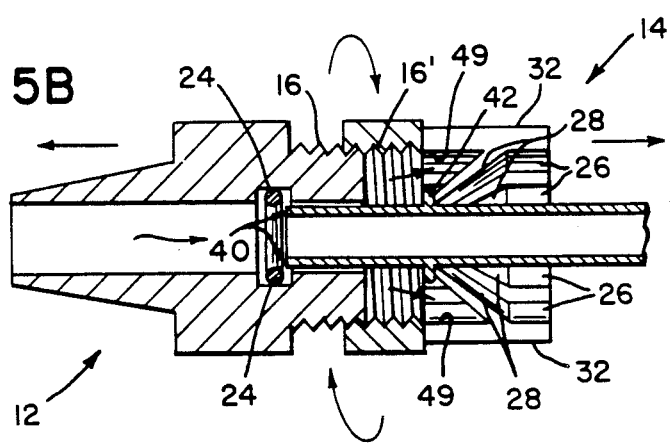
Figure 5C:
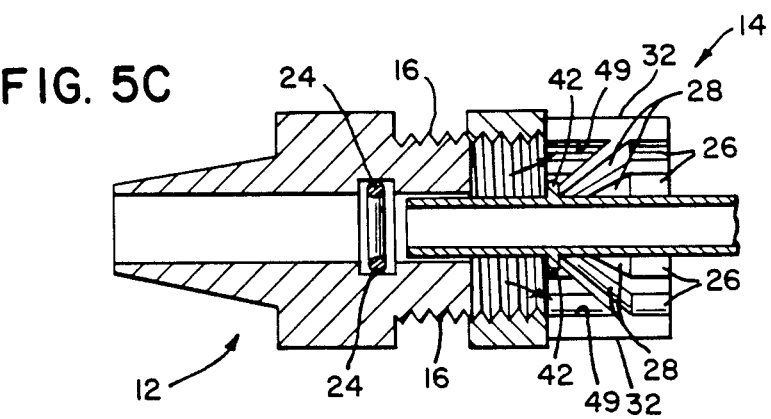

With regard to FIGS. 5A, 5B and 5C a slow disconnect mode of operation is accomplished by gradually unthreading and therefore progressively removing or displacing the retaining member 14 from the primary body 12. It should be recalled that the existence of the high pressure fluid in the coupling will force the open end 40 of the conduit 38 along the direction of travel of fluid flow generally from the free end 20 of the primary body 12 towards and in the direction of the placement of the retaining member 14. Accordingly, since the existence of the high pressure when in the completely locked position will cause the stop member 42 to engage and be locked against the free ends 44 of the fingers 28, a gradual or progressive displacement or removal of the retaining member 14 from the primary body 12 will cause a progressive displacement of the conduit along the length of the channel 18 of the primary body 12. Such gradual displacement will occur at least until the open end 40 passes at least minimally beyond the seal means 24 to the point where the fluid tight seal therebetween is broken. At this point there will be some at least minimal and controlled escape of the fluid under pressure between the exterior surface of the conduit 38 and the interior surface of the primary body 12 as indicated by the directional arrows of FIG. 5B. An expansion chamber or space 49 is formed as shown in FIG. 5B and will receive the escaping fluid. The larger dimensional features of the expansion chamber 49 will serve to further dissipate the pressurized fluid and somewhat reduce the "escape pressure" of the fluid as it passes beyond the fingers and exists the coupling over the exterior surface of the conduit. Complete detachment of the retaining member 14 from the primary body 12 will cause a complete separation of and opening of the coupling and an eventual disconnection, in the aforementioned slow mode, of the conduit 38 from the coupling generally as 10.

Other structural features of the present invention include various embodiments of the stop member. More specifically in FIG. 6 the stop member is in the form of an annular recess 45 formed in the exterior surface 38' of the conduit. This differs from the embodiment of FIG. 1 wherein the stop member is an outwardly extending annularly configured rim or ring.

Figure 6:
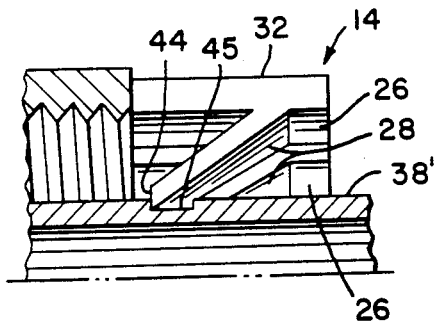
FIG. 6 is another embodiment of a stop structure associated with the conduit.

It should be noted that in the embodiment of FIG. 6 the length or longitudinal dimension of the retaining fingers 28 must be sufficient to positioned distal end 44 thereof into abutting, interruptive engagement down into the recess 45 so as to prevent the inadvertent removal of the conduit 38 along the direction of travel of the pressurized fluid.

Figure 7:
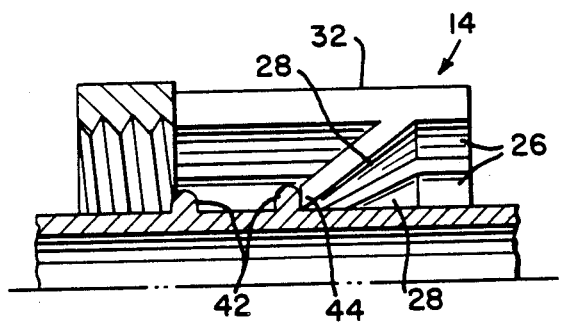
FIG. 7 is yet another embodiment of the stop structure associated with the conduit of the present invention.

FIG. 7 represents a safety feature wherein the stop member includes a first outwardly projecting ring 42 and a second outwardly projecting ring 42' spaced therefrom along the length of the conduit 38". When the conduit 38″ is in its locked or connected position the distal end 44 of the finger 28 will lockingly engage the first stop member 42. Upon the aforementioned external and opposing forces being applied to the respective arms 32 in the manner shown in FIG. 4B the respective fingers 28 will pivot out of engagement with the first stop member 42 and automatically come into abutting, interruptive engagement with the second stop members 42′. This acts as a safety measure wherein inadvertent quick detachment of the conduit 38″ is attempted under high pressure conditions.

Figure 8:
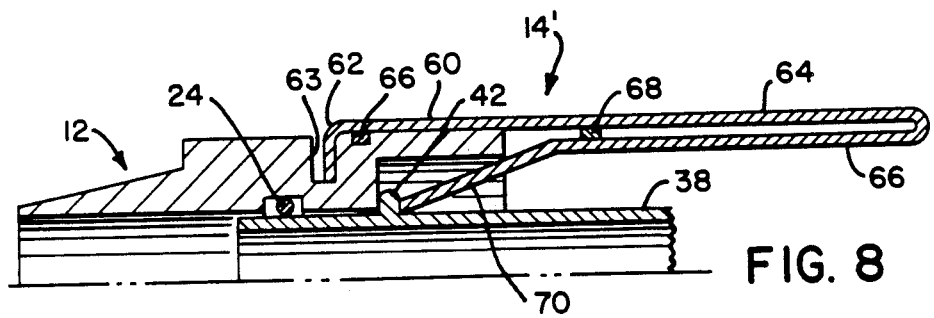
FIG. 8 is another embodiment of the coupling assembly of the present invention shown in cross section and partial cutaway.

FIG. 8 is yet another embodiment of the present invention wherein the retaining member 14′ is formed of an integral one piece metallic material of continuous length such that a main portion 60 is fixedly secured as by a spot weld 62 to the exterior of the primary body portion 12. An inwardly crimped skirt 63 is positioned into an integrally formed groove formed on the exterior of the primary body portion 12 as shown in FIG. 8. The remainder or arm 64 is of sufficient length to be folded upon itself so as to form a folded over portion 64, 66 which are spot welded or otherwise permanently secured together as at 68. The retaining finger 70 is formed by the distal end of the folded over portion 64, 66 in abutting, interruptive engagement with the stop member 42 of the conduit 38 as explained above. In the embodiment shown in FIG. 8 the coupling does not have the feature or advantage of the slow disconnect mode of operation.

Figure 9:
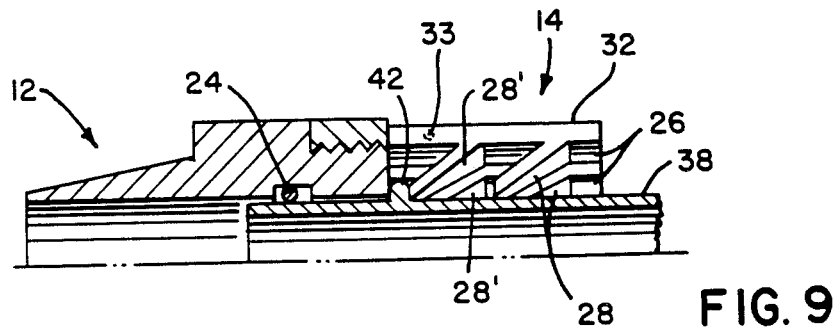
FIG. 9 is yet another embodiment of the coupling assembly of the present invention shown in cross section and partial cutaway.

FIG. 9 is yet another embodiment of the present invention wherein the plurality of arms 32 include at least two arms, (only one shown in FIG. 9 for purposes of clarity having a retaining finger 28′ positioned a first distance from the primary body 12 so as to be positioned in abutting, interruptive engagement with the stop member 42 of conduit 38 when the conduit 38 is in its connected position as shown in FIG. 9.

However, a second finger schematically represented in FIG. 9 as 38 is spaced a second distance from the primary body 12 wherein such second distance is greater than the first distance. More specifically, the retaining fingers 28 are disposed a greater distance from the stop member 42 than the first fingers 28′. Accordingly, the arms 32 to which the retaining fingers 28′ are attached must first be depressed to release the stop member therefrom. The stop member 42 then passes into engagement with the second "downstream" pair of retaining fingers 28. Additional external force is applied to the same 32 holding the second set of fingers 28 must be applied in order to totally release the conduit 38 and specifically the stop member 42 from both sets of finger 28 and 28′. It is readily seen therefore that the embodiment of FIG. 9 serves as a safeguard again, where a quick disconnect coupling is attempted inadvertently under high pressure conditions.

What is claimed is:

1. A quick connect fluid coupling assembly designed to be selectively disconnected quickly or slowly, said coupling assembly comprising:
   a. a primary body including a centrally disposed, elongated channel extending therethrough coaxially to the longitudinal axis thereof,
   b. a retaining member removably and threadedly connected to said primary body and progressively separable therefrom, a passage extending through said retaining member and disposed in aligned, coaxial relation to said channel of said primary body, said progressive separating being defined by a gradual unthreading of said retaining member from said primary body,
   c. a conduit removably disposed within said aligned channel and passage and having an open fluid receiving end disposed on the interior of said primary body,
   d. seal means mounted within said channel for defining a fluid-tight seal between said conduit and said primary body and disposable in sealing engagement with said conduit when said conduit is positioned along the length of said channel,
   e. said open end of said conduit continuously displaceable along the length of said channel upon progressive separation of said retaining element from said primary body and being disposable between said seal means and said retaining member and thereby breaking said fluid tight seal,
   f. a stop member formed on said conduit a spaced distance from said open end sufficient for disposition within said passage of said retaining member,
   g. said retaining member comprising at least two arms each oppositely disposed in spaced relation to one another and pivotally secured to a remaining portion of said retaining member,
   h. each of said arms including at least one finger element secured to an inner surface thereof and each depending from a respective one of said arms at an angular inclination inwardly towards a central longitudinal axis of said passage and towards said primary body,
   i. each of said fingers including a free end positioned in engageable relation to said stop member when said stop member is disposed between said primary body and said finger,
   j. each of said arms pivotal towards one another upon opposing external force being applied thereto and said respective fingers forced out of engageable relation with said stop member upon said external force being applied.

2. An assembly as in claim 1 wherein said stop member comprises a recess portion integrally formed in an outer surface of said conduit and extending inwardly into said outer surface in spaced relation to said open end of said conduit; each of said fingers including a sufficient length to dispose a free end thereof into engagement with said recess.

3. An assembly as in claim 1 wherein said fluid tight seal is maintained between said primary body and said conduit until said open end is displaced to a position adjacent said seal means and between said seal means and one end of said primary body threadedly connected to said retaining element.

4. An assembly as in claim 1 wherein said primary body and said conduit are cooperatively structured and dimensioned to define an escape path for fluid flow between an interior surface of said channel and an exterior surface of said conduit, said escape path disposed in fluid communication with fluid within said channel as said open end of said conduit passes beyond sealing engagement with said seal means.

5. An assembly as in claim 4 further comprising an area of fluid expansion formed within said retaining member and disposed contiguous one end of said primary body connected to said retaining member.

6. An assembly as in claim 5 wherein said area of fluid expansion is disposed in fluid communicating relation to said escape path of fluid flow and disposed relatively thereto so as to receive fluid flow exiting said escape path for expansion thereof prior to existing said coupling assembly.

7. An assembly as in claim 1 wherein said stop member comprises an outwardly projecting rim integrally formed on said outer surface of said conduit in spaced relation to said open end thereof, said rim extending outwardly a sufficient distance to engage a free end of each of said fingers.

8. An assembly as in claim 7 wherein said rim has a continuous, annular configuration extending completely about said outer surface of said rim in traverse orientation to a longitudinal axis thereof.

9. An assembly as in claim 1 wherein said stop member comprises two outwardly projecting rims integrally formed on an outer surface of said conduit in spaced relation to one another along the length of said conduit and in spaced relation to said open end thereof, each of said rims extending outwardly a sufficient distance to successively engage a free end of each of said fingers.

10. An assembly as in claim 9 wherein each of said rims has a continuous, annular configuration extending completely about said outer surface of said rim in transverse orientation to a longitudinal axis thereof.

* * * * *